United States Patent Office

3,513,005
Patented May 19, 1970

3,513,005
COATING WITH EMULSIONS
Leonard Charles Bradshaw and William James Machan Durst, Slough, England, assignors to I.B.E. Limited, Slough, Buckinghamshire, England, a British company
No Drawing. Filed Oct. 5, 1966, Ser. No. 584,381
Int. Cl. C08h 13/00; C08k 1/62; C09d 3/24
U.S. Cl. 106—277                                 21 Claims

ABSTRACT OF THE DISCLOSURE

A process of particular value in the formation of surfaces of bonded particulate material, in which particulate material is coated by mixing together particulate material to be coated, an aqueous alkaline non-clay stabilized bituminous emulsion, and a demulsifying agent, the butuminous emulsion comprising a surface active material comprising an organic sulphonate surface active agent having an ether linkage, the sulphonate being such, and the amounts of surface active agent and water being such, that the emulsion breaks quickly on mixing to individually substantially uniformly coat the particles of particulate material with adherent bituminous material, while the particles remain within the aqueous medium of the emulsion, and bituminous emulsions especially suitable for use in such process.

---

This invention relates to the application of bituminous material to particulate material to obtain substantially uniform coating of the individual particles, that is to say to coat the individual particles substantially equally. The invention is of value in any process in which particulate material is to be coated by bituminous material and is of especial value in processes in which the particles are bonded together, the bituminous material then necessarily being bondable, that is to say having a tackiness such that adjacent particles each having an adherent coating of the bituminous material bond together. It is very well known in the art what grades of bituminous material are bondable, in this sense, at the various conditions under which they may be used. The invention is of particular value in the formation of a surface of bonded particulate material on roads, footpaths, aerodrome runways, and running tracks or other similar surface areas where good running qualities are required. Conventional surface finishes on surface areas often comprise a particulate "aggregate" bonded to a layer of bituminous material or dispersed in a matrix of bituminous material. "Aggregate" in this specification means mineral particles e.g. of granite, commonly used in road making or maintenance.

Hitherto the usual surfacing treatments for such surfaces areas have comprised surface dressing or the use of coated stone carpets. Surface dressing has been practised successfully throughout the world for many years, using either hot binders, cold emulsions, or more recently hot cationic emulsions: vagaries of weather, or mis-use of these materials can give rise to loss of chippings from the surface, for example with subsequent shattering of windscreens of cars. Surface dressing consists of spraying a suitable bituminous binder on the road surface and applying to this a single layer of aggregate chippings, normally of a uniform size. With the improved laying equipment now available the use of coated stone carpets has increased considerably.

There is however a place for a surface treatment which will enable a thinner layer of coated stone to be spread over a road to arrest fretting of an existing surface and so prevent loss of stone, and also to improve the running qualities by providing a more even profile. Such a treatment would be an acceptable alternative to surface dressing and also to carpeting in cases where only a thin layer is required. The process known as slurry sealing will provide this. Slurry sealing has been used widely for treating the runways of aerodromes and under proper control it has proved successful, but whereas on runways traffic can be banned until work has been completed and the surfacing treatments allowed to cure completely, the position on public roads is that these cannot normally be closed and any hindrance to free flow of traffic can only be tolerated if this is so brief as to be negligible.

The standard process for slurry sealing aerodrome runways consists of spreading over the runway surface a mixture of fine graded aggregates (usually limestone and silica sand), bituminous emulsion, water and hydrated lime or cement. This mixture can be adjusted to spread readily and to have such rheological properties that it sets to a gel after spreading and does not flow, but a traffic-resistant surfacing is not obtained until substantially all the water has been lost by evaporation. In cold, humid zones, such evaporation is slow and so this standard process is not suitable for use on public roads.

The emulsion used for standard slurry sealing processes and for many processes involving the coating of particulate material is a fully stable anionic emulsion, as defined in British standard specification No. 434 (Class 3 Stable).

Commercial anionic bituminous emulsions fall into two broad classes: labile and stable. Labile emulsions are unstable and break as soon as aggregate is mixed with them. However the bituminous material does not deposit around the aggregate uniformly; instead lumps of bituminous material in which some particulate aggregate is embedded are formed and considerable numbers of the aggregate particles remain uncoated. The stable emulsions can be mixed with aggregate and generally break principally by evaporation of water from them. Accordingly they can only be used under conditions that permit good evaporation and even then they have to be left for several hours before they break and a use-resistant surface is formed. Any rain that falls before they set is liable to wash them away.

The labile emulsions are formed by dispersing bituminous material either in dilute alkali, the alkali reacting with naphthenic acid components of bituminous material to form soaps, or in dilute soap solution. The stable emulsions are generally formed by dispersing bituminous material in water containing much stronger surface active agents, usually resin soaps or protein solutions, or by adding such surface active agents to labile emulsions.

Proposals have been made to prepare anionic emulsions by means of dispersing agents other than ordinary soaps, resin soap and those soaps formed by saponification of bituminous material. Typical uses for such anionic emulsions have comprised treating roofing felts or binding glass mats with them and then allowing the water to evaporate off or for coating particulate aggregate to form a coating on the aggregate particles of the emulsion and then causing or allowing the water to evaporate off to allow the bituminous material to adhere to the aggregate. In our experience such emulsions have not come into wide commercial use, probably because the surface active agents are generally very much more expensive than the soaps for conventional uses and no advantages that were sufficiently marked to offset the increased expense were known.

Cationic emulsions have been proposed for use in the slurry seal process. These emulsions, in their least stable form, coat the surfaces of stones when mixed with them, almost immediately on contact, so that mixing becomes very difficult and spreading virtually impossible, unless the binder of the emulsion has a low viscosity. By increasing the amount of cationic surfactant used in the emulsion, or by use of cationic surfactants with nonionic tendencies (for example ethylene oxide condensates with fatty amines or quaternary ammonium compounds), or by use of a pre-wetting of the stone with an aqueous solution of a cationic surfactant, it has been found possible to obtain an extended mixing time which enables spreading to be carried out before coating, and therefore setting takes place. Very careful control of the process is still necessary however to ensure that the mix does not set in the travelling mixers used, but that the time between spreading and setting to a traffic-resistant state is as short as possible. Even after setting has apparently taken place with cationic slurry seals, it is frequently necessary to allow at least 20 minutes additional curing time for the necessary cohesion of the mass to develop before the surface can be subjected to use.

Thus both the known types of slurry sealing process suffer from the grave disadvantage that the surface area being coated has to be closed to use for considerable periods. Similar disadvantages apply to known processes of coating particulate material, with or without bonding of the coated particles. For example in conventional processes for producing non-bonded, free flowing, aggregate chips coated with bituminous material the emulsion has been applied to the chips and water then has to be evaporated off from the coating of the emulsion before the emulsion breaks and the bituminous material adheres to the chips. This evaporation necesarily takes a considerable period or else requires heating and the process is difficult to operate and control.

It has been our object to devise a process that results in particulate material being coated more quickly and more satisfactorily than hitherto. A further object has been to devise a process that results in particulate material being coated and, at the same time or at a chosen time thereafter, results in the particulate material being bonded together, often, preferably, into a coating over a surface area either as a bonding layer or as a wear-resistant surface. Further it has been our object to devise a process for forming on a surface area a wear-resistant finish of bituminous-coated particulate aggregate that does not necessitate the surface area being closed from use for prolonged periods and that is operable substantially irrespective of the weather, provided that the temperature is not so low that the emulsion freezes. Further it has been our object to devise a process in which any one set of process conditions can be used to obtain equally satisfactory results over a wide range of ambient temperatures.

According to our invention particulate material is coated by mixing together (1) the particulate material, (2) an aqueous alkaline emulsion of bituminous material with a surface active material and (3) a demulsifying agent in an amount in excess of that required to demulsify the emulsion, the surface active material in the emulsion comprising an organic sulphonate surface active agent containing an ether linkage and being such, and the amounts of surface active material and water being such that the emulsion breaks quickly on mixing, the particles thereupon being coated individually substantially uniformly with adherent bituminous material which adheres to the particles, while they remain within the aqueous medium of the emulsion.

Thus in our process the bituminous material is deposited on the particulate material while the latter is still within the aqueous medium of the mixture. Thus our process is in no way dependent upon the evaporation of water to cause the emulsion to break and to form a strongly adherent coating of bituminous material on the particulate material.

An essential feature of the emulsions used is that they contain at least one organic sulphonate containing an ether linkage as surface active agent. Other surface active agents that may be present as part of the surface active material may be the soap or soaps formed by reaction of the naphthenic acids in the bituminous material and dilute alkali. It is a simple matter to determine the concentrations of the various components of the surface active material that are appropriate for any particular process and the amount of water needed to obtain optimum coating in any particular process.

The dispersion should be essentially free of clay-type dispersing agents, since these appear to hinder the process by preventing the emulsion from breaking.

Speaking very generally the greater the amount of water or surface active material, or both, the slower the rate at which the emulsion breaks: and conversely the rate is increased by using lesser amounts of water and/or surface active material.

Good results can be obtained using emulsions that are derived by adding one or more organic sulphonates alone to one of the labile emulsions obtained by the dispersion of bituminous material in dilute alkali. However improved results are often obtained when we replace some of the sulphonate with other surface active agent. However, the amounts of any surface active agents in addition to the soaps formed by dispersion in alkali and the organic sulphonates are not generally such as to cause the emulsion to become stable as defined in B.S. 434 Class 3. Thus for example if resin soap is included as a surface active agent it will generally be present in an amount much less than that present in conventional stable bituminous emulsions.

Preferably, we reduce the amount of sulphonate used by substituting for part of it a non-ionic surface active agent. Suitable non-ionic surface active agents contain large hydrophobic groups as well as non-ionic hydrophilic groups. Long chain fatty acid amides and long chain esters and ethers from polyhydric alcohols, for example glyceryl monostearate, may be used, but we prefer to use polyethyleneoxy derivatives produced by the condensation of ethylene oxide with phenols, alcohols, acids and amines containing a fatty group; those with higher alkyl phenols (i.e. those in which the alkyl contains 8 carbon atoms ar more), for example nonyl phenol are preferred.

Derivatives of, for example, nonyl phenol, should preferably contain at least 9 ethyleneoxy units. For any particular higher alkyl phenol derivative the larger the number of ethyleneoxy units the less the amount of the material that is required for the same effect to be obtained i.e. a nonyl phenol ethylene oxide condensate containing 50 molar residues of ethylene oxide is more effective than one containing 9.

Another surface active agent that may be included is a protective colloid stabiliser. The stabiliser may be, for example, a water soluble protein or synthetic polymer such as polyvinyl alcohol. Gelatin-containing materials such as glue are particularly convenient and effective. Resin soaps, such as that known as "Vinsol" resin soap, may also be used satisfactorily. ("Vinsol" is the trademark of the Hercules Powder Company for a resin formed from an extract of the stumps of silver leafed pine trees).

It may be found, when using the appropriate amounts of the various surface active agents described above for use in the invention, that the water liberated may contain a little bituminous material dispersed in it. Thus the water may be discoloured. We refer to this as "tail"

and we find that we can substantially eliminate this tail by including also as part of the surface active material a higher aliphatic amine oxide (i.e. one containing 8 carbon atoms or more). It is possible by choosing the appropriate amounts of this surface active agent and of the other surface active agents to arrange that substantially clear water is liberated as soon as the emulsion breaks.

Suitable amine oxides are, for example, the trialkyl amine oxides and, especially, N,N-dimethyl-N-dodecylamine oxide.

The essential surface active agent of the emulsions is an organic sulphonate containing an ether linkage. Some selection will have to be made to choose the sulphonates that will yield wholly satisfactory results in any particular process. The aliphatic substituted aromatic sulphonates are generally preferred but aliphatic sulphonates may be used. The organic sulphonates used are preferably disulphonates and preferably aliphatic-substituted aromatic disulphonates. We find in particular that sulphonates, preferably disulphonates, of aliphatic-substituted diphenyl ethers give good results, examples being those in which the aliphatic group is dodecyl. Examples of other mono sulphonates, preferably di-sulphonates that may be used are those of alkylaryl ethers in which the aryl is other than phenyl, of alkylphenyl benzyl ethers, of polyetheraryl ethers, of polyether substituted aromatic compounds, as well as alkylaryl sulphonates and such compounds in which the alkyl group is substituted by alkanolamine. A di-sulphonate that we find of particular value is the di-sodium salt of 4 dodecylated diphenyl ether disulphonic acid. In general it seems that the organic sulphonates that yield the most satisfactory results are aliphatic-substituted diphenyl ether sulphonates.

The preferred emulsions are obtained from a labile bituminous emulsion obtained by dispersing bituminous material in dilute alkali and generally having a concentration of from 50 to 75% (all percentages by weight) preferably 60 to 65% by adding thereto; (1) 0.1%–5.0%, preferably 1 to 2%, of the organic sulphonates, preferably an alkyl diphenyl ether di-sulphonate, and most preferably the di-sodium salt of 4-dodecylated diphenyl ether disulphonic acid; (2) 0 to 1%, preferably from 0.05 to 0.5% of a non-ionic surface active agent, preferably a higher alkyl (i.e. an alkyl preferably containing 8 or more carbon atoms) e.g. nonyl phenol, ethylene oxide condensate containing more than 9, for example 10 to 50 mols of ethylene oxide per mol of higher alkyl phenol; (3) 0 to 1%, preferably 0.05 to 0.5%, of a higher aliphatic amine oxide, preferably N,N-dimethyl-N - dodecylamine oxide; (4) 0 to 5% of a resin soap; (5) 0 to 5% of a soluble protein such as casein or glue. In preparing these emulsions where more than one surface active agent is being used it is preferable to mix them together before adding them to the basic labile emulsion.

The bituminous material used is generally bitumen, as defined in British Standard 434, but others may be used. As defined in British Standard 434, bitumen is a very viscous liquid or a solid, consisting essentially of hydrocarbons and their derivatives, which is soluble in carbon disulphide; it is substantially nonvolatile and softens gradually when heated. It is black or brown in colour and possesses waterproofing and adhesive properties. It is obtained principally by refinery processes from petroleum, and is also found as a natural deposit or, in association with mineral matter, as a component of naturally occurring asphalt. Bitumen used in any particular process will be chosen with regard to the ultimate properties desired of the surface finish and with regard to the conditions, and in particular the prevailing temperature under which the process is to be carried out. For most purposes when the bitumen is bondable and the coated particles are to adhere together, and for the slurry coating of roads, paths and runways, it has been found that best results are obtained if the penetration value of the bitumen at the temperature of use lies between 40 and 200 when tested in accordance with Method 1P49/63 1.P. Standards for petroleum and its products, Part 1, 1963. According to this method, the penetration of a bituminous material is the distance in tenths of a millimeter that a standard steel needle penetrates vertically into a sample of the material under fixed conditions of loading, time, and temperature. The penetration is determined at 77° F. (25° C.) using a penetrometer by means of which a standard steel needle (diameter 1–1.02 mm., symmetrically tapered at one end to a cone approximately 6.35 mm. in height and of which the angle is within the range of 8°40' and 9°40'; said cone being truncated and having a smaller base of 0.14–0.16 mm. in diameter and a frustum length of 5.0–5.8 mm.) is applied to the sample for five seconds under a load of 100 grams. Accordingly the bitumens of lower penetration at the standard temperature of 25° C. (being the more viscous) are used in such processes when working at the higher temperatures and the bitumens of higher penetration at standard temperature are used when working at the lower temperatures. Higher penetration of he bitumen may be obtained by mixing with a volatile cutting oil.

When using an emulsion of a bitumen with a penetration value at the higher end of the range at the temperature of use, the use of an increased amount of water and/or of surface active material is necessary, and vice versa.

It is well known that most emulsions, including particularly labile bituminous emulsions, may be demulsified by the addition to them of some suitable demulsifying agent. Indeed contact of a labile emulsion with crushed stone causes breakdown of the emulsion.

In both cases the bitumen is precipitated in coarse clumps formed by agglomeration of the particles of the emulsion. In our process however the emulsion is broken but coarse clumps are not formed but instead uniform coating results. By this we mean that substantially all the particles of particulate material individually are effectively coated in bituminous material.

The most preferred demulsifying agents for use in the invention are lime, baryta and various calcium salts. Also highly effective are the hydroxides, and salts e.g. the chlorides and sulphates of other multivalent metals such as magnesium, aluminium and zinc and also the double salts such as alums. The agents may be formed in situ, for example by using oxides which will form hydroxides when water is added. Cement may be used. Various cationic materials may be used as alternative demulsifying agents e.g. quaternary ammonium compounds. Higher fatty acids e.g. oleic acid may also be used.

The amount of any particular demulsifying agent that brings about the most satisfactory demulsification and coating of the particulate material can readily be found by simple experiment. In general there is a critical value below which demulsification does not occur, this probably being the theoretical amount required to demulsify the emulsion, and provided that this is exceeded the rate at which the emulsion breaks and the particulate material is coated increases with increasing amount of demulsifying agent up to an optimum above which no further improvement of consequence is obtained.

Generally speaking it has been found that effective demulsification is generally produced with 0.5% by weight of calcium hydroxide based on the particulate material. Preferably 1% is used and even a greater excess has no harmful effect. Even 0.5% of lime is in excess of the quantity theroretically required to cause breakdown of the emulsions employed in this invention. When cement is used as the demulsifying agent weights double those quoted for lime appear to be desirable.

The particulate material may be particulate aggregate but can instead be fibrous material, cellular particulate material, e.g. vermiculite, or substances in any other desired form, with or without aggregate. Thus some or all of the particulate material may be of, for example, sisal, glass or polypropylene fibres. This is of particular value when the coated particles are to be bonded together to serve as the surface layer, or as an intermediate bonding layer on to which another surface is to be superimposed, as in the construction of running tracks or other such similar construction. The bituminous material in combination with a fibrous aggregate provides a resilient surface in which running spikes can be embedded wtihout permanently damaging the surface. If desired the emulsion or aggregate or both can be coloured in order that the surface finish resembles grass or any other desired finish. It has been found possible to grow grass through such a fibrous surface, thus providing a grass playing surface with the grass roots protected from disturbance.

The particulate material used in any particular process will control to a certain extent the amounts of the particular surface active agents being used in the emulsion to obtain best results. Again, any adjustments in the components of the emulsion that may be necessary in order to achieve optimum results with any particular particulate material can readily be found by simple experiment.

The amounts and type of surface active agents and the amount of water in any particular mix control the rate at which the emulsion breaks and coats the particulate aggregate in that mix. An advantage of the invention is that after completing the mixing of the demulsifier, aggregate and emulsion the emulsion breaks quickly with coating of the particles. If the amount of demulsifying agent is rather low, for example being 0.3% by weight, based on the weight of particulate material of lime the emulsion may require a period of, for example, 10 minutes to break and coat the particles. Even this period is still very quick compared with the period conventionally needed for the breaking of anionic emulsions. With optimum amounts of demulsifying agent periods of 5 minutes or less may be all that are required after mixing for breaking. For example when there is 0.5% lime it is possible readily to arrange the amount of water so that breaking occurs within 2 or 3 minutes or less of initial mixing.

The coated particles may be used for bonding into any desired shape, for example into a building block or into a surface finish over a surface area. For example the process may be used for coating a slurry over a surface, in a manner resembling slurry sealing processes, to form a wear resistant surface or to form an intermediate bonding layer.

The breaking of the emulsion and coating of the aggregate may occur either substantially wholly before the mixture is formed into the desired shape or during or after shaping the mix. If the emulsion breaks and coating occurs substantially no free bituminous material remains in the aqueous phase. The natural tendency for the mix is then to set before spreading or forming. However, continued mixing after the emulsion breaks results in the generation of a foam structure containing the aggregate particles coated by substantially all the bituminous material. This foam remains workable for as long as the structure of the foam remains. Continued agitation of the foam will retain its foam structure but it is also easily possible so to choose the surface active agents in the emulsion that a foam may be obtained that is stable after agitation stops. It is no problem to make a foam that is stable for 10 minutes after stopping agitation and, by using surface active agents, known to promote foaming, foams may be obtained that are stable under suitable conditions for several days or even weeks. The non-ionic surface active agents and the amine oxides mentioned are suitable for promoting foaming. In general it is necessary that the foam should not be subjected to pressure if it is to be stored and should not be exposed to the open atmosphere. The foam structure of any foam usually collapses when the foam is spread out into a thin layer, for example in forming a surface over a large surface area, and/or when subjected to pressure, for example on rolling such a surface or on moulding the foamed material.

A mix, described below as brown, is used if coating is required during or after shaping. If coating is required before shaping the kind of mix described below as black is used. Speaking very generally a brown mix may be obtained by including more water or more surface active agents than is required to obtain a black mix. In general when we are applying a surface layer or finish to a surface area we find it most convenient to apply a brown mix as then we can form the mixture and apply it to form a surface coating all as a single operation within a few minutes. A brown mix also has the advantage that it remains fluid and brown for long periods of stirring for example an hour. It is, however, sometimes desirable to form a surface that is remote from the mixer. It is then desirable to use a black mix preferably having a foam structure that collapses, or is caused to collapse, within a period of not more than about 10 minutes after spreading.

The surface obtained on spreading a brown mix is wear-resistant substantially immediately upon the particles becoming coated or, from a black mix, as soon as the foam collapses. Thus it can then withstand all normal usage. Thus if the surface is to be the wear-resistant surface of a road it can be subjected to normal traffic almost immediately after spreading.

The total amount of water required in the process may be provided by the emulsion before mixing with the aggregate, or additional water may be added when mixing in the aggregate.

A preferred manner of carrying out a slurry coating process according to the invention on a large scale is to charge particulate aggregate, demulsifying agent, water, and aqueous bituminous emulsion separately into separate hoppers on a travelling mixer. This is fitted with at least one mixer and with meters for supplying continuously into the mixer a metered flow of each of the four components. In the mixer a thorough mixture of the four ingredients is obtained and this is then fed to a spreading-box towed behind the travelling mixer and by means of which a layer of metered thickness is spread on the surface area being coated. It is often preferred to have two mixing compartments, the mixture from one being passed to the second before it is passed out to the spreader-box. In a typical process according to the invention this mixer may travel, while spreading the slurry, at a speed of 1.5 to 3 kilometres per hour. It is not necessary to close the road surface to traffic and in fact traffic can be allowed to use the treated surface within a few minutes.

It is desirable to roll the surface in order to squeeze the water out of the finish. The passage of traffic may provide adequate rolling but in order to ensure uniform rolling it is preferred to roll the surface with a suitable roller, for example one having a number of pneumatic tyres, before passage of traffic. Under optimum conditions of operation a substantially white foam of water and surface active agent only is squeezed out of the coated finish.

It is possible so to select the components of the mixture and the manner of application that traffic can run over the surface within 2 to 3 minutes, or at the most 5 minutes, of the mixture being spread with no damage to the surface and traffic, to a limited extent, can go over the surface even before this, without spoiling it. These remarks apply especially when a brown mix is spread and apply irrespective of the weather provided it is not freezing. The mix can be applied when it is raining and has in fact even been applied while the surface was at all times submerged under water.

These properties are in marked contrast to the properties of all known slurry sealing processes which have required the selection of drying weather conditions and have required the surface to be wholly closed to traffic for periods of from half an hour to 8 hours or more.

A further advantage of the slurry coating process of the invention is that the same mixture can be used to fill indentations in the road surface, or even serious pot holes, as can be used to coat the surface. Before spreading the mix of aggregate and emulsion onto a surface area it may be desirable to apply a tack coat.

The aggregates used in slurry coating processes according to the invention are generally but not always finely graded. If a coarse surface is desired, a layer of larger chippings e.g. 20 mm. is applied to the road by the process described above as surface dressing, and this is followed by the slurry coating process described above, which ensures that the chippings will not become loose.

The following are examples which illustrate the invention.

EXAMPLE 1

A mixture for slurry coating a road surface or aircraft runway by a process resembling in some respects slurry sealing was prepared by mixing the following ingredients in a mechanical mixer.

| | Parts by weight |
|---|---|
| Dust limestone (2.5 mm.) | 134 |
| Sharp sand | 90 |
| Hydrated lime | 2 |
| Water | 40 |
| Labile bitumen emulsion | 40 |
| Plus additives. | |

The mixture of limestone, lime and sand is a self-binding mixture and is designed to conform to the following specification:

| Passing— | Percent |
|---|---|
| 5 mm. sieve | 100 |
| No. 7 sieve | 95–100 |
| No. 14 sieve | 70–95 |
| No. 25 sieve | 55–70 |
| No. 52 sieve | 30–45 |
| No. 100 sieve | 10–25 |
| No. 200 sieve | 3–10 |

(References are to British Standard Sieve Numbers.)

The bitumen emulsion was basically a labile emulsion made by dispersing bitumen in dilute alkali by a standard method (for example that of British patent specification 226,032). According to this British patent specification, such bitumen emulsion is produced by admixing directly, with agitation, melted bitumen and a dilute aqueous caustic alkaline solution. It has a bitumen content of 65%, the bitumen used having a penetration value of 190–210 (as measured by the Institute of Petroleum method 49/63). The following additions were made to it before mixing with the aggregate, the additions themselves being mixed together in the order given and added to 100 parts by weight of the labile bitumen emulsion:

| | Parts by weight |
|---|---|
| Di-sodium salt of 4-dodecylated diphenyl ether disulphonic acid (commercial product 45% active) | 1.6 |
| Nonylphenol ethylene oxide condensate containing 9 mols ethylene oxide per mol of nonylphenol | 0.16 |
| N,N-dimethyl-N-dodecylamine oxide (commercial product 30% active) | 0.32 |
| 5% w./w. glue solution in water | 2.14 |

The aggregate and dry lime were weighted into the mixer, and the premixed water and emulsion introduced, mixing being effected at an atmospheric temperature, for example, of 21° C. Within a minute the aggregate had become coated, and within two minutes a foamed structure had developed, at which stage the slurry was spread by squeegee or by spreader-box onto a road surface previously given a tack-coat of cationic bitumen emulsion. Soon after spreading the slurry lost its foamed structure and a traffic-resistant surface was thereupon formed. It was preferably rolled to compact it and to squeeze water out. The time taken for the foam to disappear depended on the amount of water present and on the ambient temperature, but under suitable conditions was less than 5 minutes. If the period was longer the constituents of the mixture were adjusted in order to reduce it. For example the amount of additive to the labile emulsion was reduced. The slurry was resistant to rain at all stages. The surface could be opened to traffic as soon as the traffic-resistant surface had been formed (i.e. within less than 5 minutes of spreading) but preferably it was rolled first.

The amount of water used could be varied according to the reactivity and grading of the aggregates and also to the temperature prevailing. For example, when mixing was effected at 15° C., 20 parts instead of 40 parts of water were used. Employing a bitumen having a penetration value of 280/320 and a temperature of 15° C., 30 parts water were required.

By appropriate further modifications of the amount of water or the emulsifying agent or the penetration value of the bitumen it was possible to conduct this process at temperatures down to freezing point, 0° C.

EXAMPLE 2

A travelling mixer, generally as described above, fitted with separate hoppers for aggregate, lime, water and bitumen emulsion and fitted also with two mixing compartments and a spreader-box, was used for applying a finish to a road surface or aircraft runway. The limestone and sand were of the same size classification as given in Example 1, but were premixed, and the bitumen emulsion used was the same as described in Example 1. The mixture of limestone and sand, the lime, and the bitumen emulsion were metered from their hoppers into the first mixer compartment in the proportions given in Example 1 but the amount of water used was 50 parts by weight. The components were mixed first in one compartment and then in the second and the total time of mixing, before passing to the spreader-box, was substantially less than 1 minute. The mixture in the spreader-box was brown, which meant that a large proportion of the bitumen was still in emulsion form and the aggregate was still at least partially uncoated, and the mix had a very fluid consistency. The spreader-box was adjusted to deposit a layer of about 5 mm. thick on the surface being coated. Throughout the mixing and spreading operation the mixer travelled at 2.5 kilometers per hour and within 1 minute the surfacing was traffic resistant. After the traffic resistant finish was formed a rubber tyred roller was used to compress it and to squeeze water and foam out of the surface. Substantially clear water and white foam flowed off.

By appropriate adjustment of the amounts of water and the components of the emulsion this process could be operated at temperatures down to freezing point and it could be operated while rain was falling. In fact the process has been operated to coat a surface that was at all times submerged under water.

EXAMPLE 3

A mixture was used that was substantially the same as in Example 2 except that instead of a mixture of sand and limestone, a single granitic aggregate which conformed to the following grading specification:

| Passing— | Percent |
|---|---|
| 5 mm. sieve | 100 |
| No. 7 sieve | 95–100 |
| No. 14 sieve | 57–93 |
| No. 25 sieve | 35–68 |
| No. 52 | 20–45 |
| No. 100 sieve | 10–25 |
| No. 200 sieve | 5–15 | was used.

Using the same method as in Example 2, a similar result was obtained.

For slurry sealing roadways, as distinct from aerodrome runways, it is preferable to use a single aggregate such as granite with a higher skid resistance than is possible with limestone plus sand.

EXAMPLE 4

A composition for surfacing hard tennis courts was prepared by mixing at 24° C. the following ingredients:

| | Parts by weight |
|---|---|
| Sisal cuttings 3 mm.–50 mm. | 6 |
| 3 mm./0 mm. granite | 72 |
| Cork 3 mm.–1.5 mm. | 8 |
| Hydrated lime | 3 |
| Red iron oxide | 8 |
| Bitumen emulsion | 80 |

The bitumen emulsion was prepared by adding 3.4% of the di-sodium salt of 4-dodecylated di-phenyl ether di-sulphonic acid (45% active meterial) to a labile bitumen emulsion as described in Example 1. At 24° C. no additional water was required. A black coated mix was obtained after two minutes mixing and a surface that could be walked on within one minute of spreading. When this mix was spread 20 mm. thick over a seed bed sown with grass seed, a good growth of grass through the surfacing was obtained.

EXAMPLE 5

A composition for surfacing indoor running tracks was prepared by the following ingredients:

| | Parts by weight |
|---|---|
| Rubber crumb 3 mm. | 75 |
| Hydrated lime | 6 |
| Glass fibre 3 mm. | 12 |
| Water | 18 |
| Bituminous emulsion (as Example 1) | 54 |

A black coated mix was obtained after two minutes mixing and a surface that was rain resistant and that could be walked on within one minute of spreading.

We claim:

1. A process in which particulate material is coated uniformly by quick breaking of a bitumen in water emulsion which comprises the steps of (A) mixing together (1) an aqueous alkaline bitumen in water emulsion containing surface active material, the surface active material in the emulsion consisting essentially of 0.1 to 5% of an organic sulphonate surface active agent containing an ether linkage, and (2) the particulate material to be coated which is selected from the group consisting of aggregate, fibrous material, and cellular material, and (B) demulsifying the emulsion with a sufficient amount of a demulsifying agent selected from the group consisting of oleic acid, hydroxides, oxides, chlorides and sulfates of calcium, barium, magnesium, aluminum and zinc and double salts thereof to break the emulsion, the particles of the particulate material thereby being coated individually substantially uniformly with adherent bitumen which adheres to the particles, while the particles remain within the aqueous medium of the emulsion.

2. A process according to claim 1 comprising further mixing the bitumen coated particles in aqueous medium for a period sufficient to convert the aqueous medium to a foam containing the said bitumen coated particles, and thereafter shaping to the desired shape.

3. A process according to claim 1 in which the bituminous material is bondable and in which the mixture is formed into the desired shape immediately after adding the demulsifying agent and before the emulsion breaks.

4. A process according to claim 1 comprising spreading the bitumen coated particles in aqueous medium on a surface selected from the group consisting of a road, runway, track and tennis court to form a resilient, wear-resistant layer of individually bitumen coated particles which are bonded one to another and to the surface.

5. A process according to claim 4 wherein the coated particles are aggregate and, wherein demulsification occurs substantially immediately upon spreading with liberation of water.

6. A process according to claim 5 wherein a resilient, wear-resistant surface is obtained within 2 minutes of spreading.

7. A process according to claim 2 wherein the particulate material is aggregate, and wherein the desired shape is obtained by spreading the material to form a foamed surface layer which collapses within 10 minutes after spreading.

8. A process according to claim 1 in which the sulphonate is an aliphatic-substituted diaryl ether sulphonate.

9. A process according to claim 8 in which the sulphonate is an alkyl substituted diphenyl ether sulphonate.

10. A process according to claim 1 in which the sulphonate is a disulphonate.

11. A process according to claim 1 in which the sulphonate is the disodium salt of 4-dodecylated diphenyl ether disulphonic acid.

12. A process according to claim 1 in which the surface active material includes a non-ionic surface active agent, said non-ionic agent being a polyethyleneoxy derivative containing at least 9 ethyleneoxy units and produced by the condensation of ethylene oxide with a higher alkyl phenol.

13. A process according to claim 12 in which the said non-ionic surface active agent is a nonyl phenol ethylene oxide condensate.

14. A process according to claim 1 in which the surface active agent includes an amine oxide, said amine oxide being N,N-dimethyl-N-dodecylamine oxide.

15. An aqueous alkaline non-clay stabilized bitumen in water emulsion suitable for use together with particulate material to be coated selected from the group consisting of particular aggregate, fibrous material, and cellular particulate material and a demulsifying agent selected from the group consisting of oleic acid, hydroxide, oxides, chlorides and sulfates of calcium, barium, magnesium, aluminum and zinc and double salts thereof in the substantially uniform coating of individual particles of the particulate material to be coated with adherent bituminous material which adheres to the particles, while the particles remain within the aqueous medium of the emulsion, the bitumen in water emulsion having a concentration of 50 to 75% and containing also, based on the weight of the emulsion, surface active material consisting essentially of 0.1 to 5% of an organic sulphonate surface active agent containing an ether linkage.

16. An emulsion according to claim 15, containing soap formed by reaction of a naphthenic acid and alkali.

17. An emulsion according to claim 15 in which the organic sulphonate is an aliphatic substituted diaryl ether sulphonate.

18. An emulsion according to claim 1 in which the organic sulphonate is an alkyl substituted diphenylether sulphonate.

19. An emulsion according to claim 1 in which the organic sulphonate is a disulphonate.

20. An emulsion according to claim 15 containing surface active material consisting essentially of an organic sulphonate that is the disodium salt of 4-dodecyl diphenyl ether disulfonic acid.

21. An emulsion according to claim 15 comprising surface active material consisting essentially of 1 to 2% of the sodium salt of 4-dodecylated diphenyl ether disulphonic acid, 0.05 to 0.5% of a higher alkyl phenol ethylene oxide condensate containing more than 9 mols of ethylene oxide per mol of higher alkyl phenol, and 0.05 to 0.5% of N,N-dimethyl-N-dodecylamine oxide.

References Cited

UNITED STATES PATENTS

| | | | |
|---|---|---|---|
| 2,503,246 | 4/1950 | Craig | 106—277 XR |
| 2,652,341 | 9/1953 | Craig | 106—277 |
| 2,828,266 | 3/1958 | De Groote et al. | 252—332 |
| 2,828,267 | 3/1958 | De Groote et al. | 252—332 |
| 2,828,269 | 3/1958 | De Groote et al. | 252—332 |

OTHER REFERENCES

Schwartz, et al., Surface Active Agents and Detergents, vol. II, Interscience Publishers Inc., New York, 1958. TP 149 53 C. 5, pp. 707–7; "(C) Demulsification of Crude Petroleum."

JULIUS FROME, Primary Examiner

J. B. EVANS, Assistant Examiner

U.S. Cl. X.R.

94—20, 23; 106—280, 281; 252—311.5